United States Patent
Leoncavallo

(10) Patent No.: US 8,676,150 B2
(45) Date of Patent: Mar. 18, 2014

(54) WAKE-UP METHOD FOR A MULTI-CHANNEL RECEIVER AND MULTI-CHANNEL WAKE-UP RECEIVER

(75) Inventor: Ruggero Leoncavallo, Gratkorn (AT)

(73) Assignee: AMS AG, Unterpremstaetten (AT)

( * ) Notice: Subject to any disclaimer, the term of this patent is extended or adjusted under 35 U.S.C. 154(b) by 44 days.

(21) Appl. No.: 13/202,325

(22) PCT Filed: Feb. 15, 2010

(86) PCT No.: PCT/EP2010/051866
§ 371 (c)(1),
(2), (4) Date: Dec. 2, 2011

(87) PCT Pub. No.: WO2010/094654
PCT Pub. Date: Aug. 26, 2010

(65) Prior Publication Data
US 2012/0071124 A1    Mar. 22, 2012

(30) Foreign Application Priority Data

Feb. 18, 2009  (EP) .................................... 09002305
Apr. 8, 2009   (EP) .................................... 09005180

(51) Int. Cl.
*H04B 1/16*   (2006.01)
(52) U.S. Cl.
USPC ........................ 455/343.1; 455/572
(58) Field of Classification Search
CPC ................................ H04B 1/1607; H03J 7/18
USPC ................ 455/343.1–343.6, 160.1–169.2, 455/572–574, 127.5
See application file for complete search history.

(56) References Cited

U.S. PATENT DOCUMENTS

| | | | | |
|---|---|---|---|---|
| 4,977,611 A | * | 12/1990 | Maru | 455/161.2 |
| 5,170,490 A | * | 12/1992 | Cannon et al. | 455/343.4 |
| 5,525,992 A | | 6/1996 | Froschermeier | |
| 5,532,683 A | * | 7/1996 | Kondo | 455/343.5 |
| 5,726,646 A | * | 3/1998 | Bane et al. | 340/870.03 |
| 5,937,351 A | | 8/1999 | Seekins et al. | |
| 5,940,746 A | * | 8/1999 | Otting et al. | 455/343.2 |
| 6,535,752 B1 | * | 3/2003 | Dent | 455/574 |
| 6,990,362 B2 | * | 1/2006 | Simpson et al. | 455/574 |
| 8,203,463 B2 | * | 6/2012 | Bragg et al. | 340/870.02 |

(Continued)

FOREIGN PATENT DOCUMENTS

| | | |
|---|---|---|
| GB | 2 308 788 | 7/1997 |
| WO | WO 98/32295 | 7/1998 |

OTHER PUBLICATIONS

"AS3931 3D Low Power Wakeup Receiver", Data Sheet by austriamicrosystems AG, Revision R6, pp. 1-31, Sep. 2008.

*Primary Examiner* — Lana N Le
(74) *Attorney, Agent, or Firm* — McDermott Will & Emery LLP

(57) ABSTRACT

A wake-up method for a multi-channel receiver comprises the following steps: checking for activity on every available channel by switching from one channel to the next thereby activating and subsequently deactivating one channel after the other; when activity is detected at least on one of the available channels, switching on all channels, measuring a respective received signal strength in every channel and performing a comparison of received signal strengths between all channels; and selecting the channel with the highest received signal strength. Further a multi-channel wake-up receiver is presented.

15 Claims, 2 Drawing Sheets

(56) References Cited

U.S. PATENT DOCUMENTS

| | | |
|---|---|---|
| 8,346,234 B2 * | 1/2013 | Banga et al. ............... 455/226.1 |
| 2001/0055350 A1 * | 12/2001 | Higure ......................... 375/345 |
| 2002/0077113 A1 | 6/2002 | Spaling et al. |
| 2003/0123413 A1 * | 7/2003 | Moon et al. .................. 455/522 |
| 2003/0181211 A1 | 9/2003 | Razavilar et al. |
| 2005/0237160 A1 | 10/2005 | Nolan et al. |
| 2005/0243936 A1 | 11/2005 | Agrawala et al. |
| 2010/0173590 A1 * | 7/2010 | Moorti et al. ................ 455/63.1 |

* cited by examiner

WAKE-UP METHOD FOR A MULTI-CHANNEL RECEIVER AND MULTI-CHANNEL WAKE-UP RECEIVER

RELATED APPLICATIONS

This application is a U.S. National Phase Application under 35 USC 371 of International Application No. PCT/EP2010/051866, filed on 15 Feb. 2010.

This application claims the priority of European Application nos. 09002305.2 filed Feb. 18, 2009 and 09005180.6 filed Apr. 8, 2009, the entire content of both of which are hereby incorporated by reference.

BACKGROUND OF THE INVENTION

A wake-up receiver, in particular a low frequency, LF, wake-up receiver is used in the field of, for example, wireless sensors, access control, operator identification, real-time location systems, or active RFID tags. A wake-up receiver monitors the surrounding electromagnetic field in a certain frequency range and switches on a connected main system, for instance a micro-controller, a transceiver or else, every time that certain conditions are verified. A condition, for instance, is frequency and/or pattern detection. Thereby, the wake-up receiver generally works in background alongside the main system. Consequently, as long as conditions are not verified, the main system is switched off and only the wake-up receiver is operating. This mode of operation is called listening mode. Thus, the current consumption of a wake-up receiver is a very low, e.g. comparable to battery leakage current. A wake-up receiver is supposed to be always on. Since at low frequencies the received field is strongly influenced by the orientation of the transmitter or receiver, wake-up receivers usually have more than one channel in order to monitor the field in multiple directions. An additional antenna is mounted to a wake-up receiver for each receiving channel. This leads, for example, to a two or three dimensional field monitoring. As a consequence, the higher the number of channels, the higher the current consumption gets in listening mode.

In a state-of-the-art implementation of a wake-up receiver, the receiver operates in a so-called channel rotation mode: one channel after the other is cyclically checked for activity. When activity is detected, the currently active channel is enabled to receive data. The other channels having different antenna orientation are not used even in case they could deliver a better and stronger signal. The obvious deficiency is a shorter range of communication since the signal used to decode data is not necessarily the strongest signal available. In this way, the sensitivity of the receiver is reduced.

In another example of an existing wake-up receiver, the device has three channels offering the possibility to switch off one or more channels through register setting. With this device, channel rotation can be implemented only by using an external micro-controller which switches on and off a number of channels per time with a certain rotation time. The use of a micro-controller compromises the advantage in power saving of the wake-up receiver.

In a third implementation example, all available channels are simultaneously switched on during the check for activity resulting in high power consumption.

SUMMARY OF THE INVENTION

It is an objective of the invention to provide a wake-up method for a multi-channel receiver and a multi-channel wake-up receiver which minimize power consumption and maximize sensitivity.

In one embodiment example, a wake-up method for a multi-channel receiver comprises the following steps: checking for activity on every available channel by switching from one channel to the next, thereby activating and subsequently deactivating one channel after the other; when activity is detected at least on one of the available channels, switching on all channels, measuring a respective received signal strength in every channel and performing a comparison of received signal strength between all channels; and selecting the channel with the highest received signal strength.

In a channel rotation mode or manner, every available channel is checked for activity, for instance the presence of a carrier frequency. As soon as an activity is detected on at least one of the channels, all channels are switched on in order to perform the comparison of received signal strengths amongst all channels. The channel with the highest signal strength is selected.

The selected channel is the one with the highest signal strength, which for example means that the respective antenna has the best orientation.

Because of the channel rotation, only one of the available channels is active at the time. By this, a low power consumption is achieved. The power consumption is similar to a receiver with only one channel. Due to the comparison of the received signal strengths and selection of the channel with the strongest signal, the sensitivity of the receiver is maximized. This results in a wider range of the receiver.

In one embodiment in a receiver with a number of N channels, checking for activity on every available channel comprises switching on a first channel, checking for activity in the first channel, switching off the first channel, switching on a second channel, checking for activity in the second channel, switching off the second channel, and so on until switching on the $N^{th}$ channel, checking for activity in the $N^{th}$ channel, switching off the $N^{th}$ channel. Thereby, one channel is active at a time, while the other channels are inactive.

To measure the received signal strength, a received signal strength indicator, RSSI, can be used.

In another embodiment example of a wake-up method, a logarithmic envelope amplifier is used in each channel for received signal strength measurement.

The logarithmic envelope amplifier generates a received signal strength, which is proportional to the logarithm of a received field strength within a specified dynamic range.

In another embodiment example of the method, during measuring the respective received signal strength in every channel and performing the comparison of received signal strengths between all channels, a preamble of the received signal is detected.

In a further embodiment example of the method, after selecting the channel with the highest received signal strength, a detection of wake-up pattern in the received signal is performed in the selected channel.

The preamble of the signal is used for example to recover a clock in case of a Manchester coding. The pattern comprises several bits and is transmitted as digital data in the signal. The received pattern is correlated with a stored pattern. If the two patterns match, a wake-up signal is generated to prepare the main system for further data reception.

In one embodiment example, a multi-channel wake-up receiver with several channels comprises for each channel an activity detector and a signal strength measurement unit. The receiver further comprises a comparison unit. Each activity detector has an input to be supplied with a carrier signal and an output to provide an activity signal. Each signal strength unit is coupled to one activity detector and has an output to provide a received signal strength indication signal. The comparison unit is coupled to the output of each signal strength measurement unit and has an output to provide a selection of the channel with the highest received signal strength.

In the multi-channel wake-up receiver, one activity detector after the other checks its respective input for activity, for instance for a carrier frequency. As soon as activity is detected by one of the activity detectors, all activity detectors and signal strength measurement units are activated and provide a received signal strength indication signal for every channel. The comparison unit compares the different received signal strength indication signals and selects the channel with the highest received signal strength.

As in the beginning of the operation of the multi-channel wake-up receiver only one of the activity detectors is active at a time, low power consumption is achieved, the power consumption being similar to a one-channel wake-up receiver. Nevertheless, as the comparison unit selects the channel with the highest received signal strength amongst all channels, a high sensitivity of the multi-channel wake-up receiver is achieved.

In another embodiment example of the wake-up receiver, the respective signal strength measurement unit comprises a logarithmic envelope amplifier.

In another embodiment example, the multi-channel wake-up receiver comprises a control unit which is adapted to run the receiver in a first and in a second mode of operation. In the first mode of operation, only the activity detectors are cyclically activated channel by channel. In the second mode of operation, all activity detectors and all signal strength measurement units are activated at the same time.

In the first mode of operation, a channel rotation is performed, wherein the channels are respectively activated, checked for activity, e.g. a carrier frequency, and deactivated, one channel after the other. As soon as activity is detected on one channel, the receiver switches to the second mode of operation, wherein a measurement of received signal strengths is conducted simultaneously on all channels.

Because of the channel rotation, only one of the N channels of the multi-channel receiver is active at the time. Thus, in the first mode of operation, current consumption of the other N−1 channels is saved. As all channels are taken into account for the comparison of signal strengths in the second mode of operation, selection of the channel with the strongest signal is possible, resulting in a maximized sensitivity of the receiver.

In another embodiment example, the receiver comprises a pattern detector coupled to the output of each signal strength measurement unit, the pattern detector having an output to provide a wake-up signal.

As soon as the channel with the highest received signal strength is selected and activated, a digital pattern is received in the carrier signal and detected by the pattern detector. If the received pattern matches a stored pattern, the pattern detector generates the wake-up signal. This enables a subsequent controller to wake up and recover from power-down or sleeping mode.

In another embodiment example, the duration of the carrier signal is at least the sum of run times of all activity detectors of the receiver.

The run time of an activity detector is the amount of time an activity detector is active during the first mode of operation in the channel rotation. The run time of one activity detector is also denoted the rotation period. The duration of the carrier signal is also called a burst.

In another embodiment example, the carrier signal comprises a low frequency, modulated signal.

The frequency of the carrier signal, for example, is in the range of 110 to 150 kHz. The signal is modulated using, for instance, amplitude-shift keying, ASK, or on-off keying, OOK, as a digital modulation.

In another embodiment example, the carrier signal comprises a preamble followed by a wake-up pattern.

In another embodiment example, each channel corresponds to a respective antenna mountable to the receiver.

Each antenna may cover a different direction or axis of the electromagnetic field surrounding the receiver.

BRIEF DESCRIPTION OF THE DRAWINGS

The text below explains the invention in detail using embodiment examples with reference to the drawings, in which.

DETAILED DESCRIPTION OF THE DRAWINGS

Figure 1:
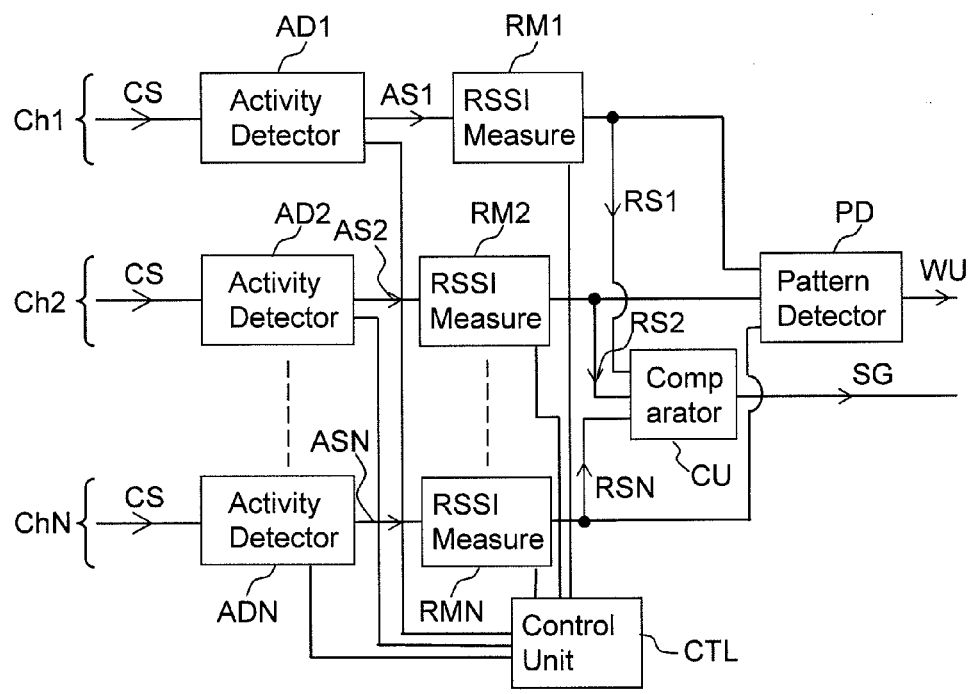
FIG. 1 shows an embodiment example of a multi-channel wake-up receiver.

FIG. 1 shows an embodiment example of a multi-channel receiver. The receiver comprises N channels. In the drawing, a first channel Ch1, a second channel Ch2, and an $N^{th}$ channel ChN are depicted. Each channel comprises an activity detector ADx, and a signal strength measurement unit RMx. Thus, the first channel Ch1 comprises a first activity detector AD1, and a first signal strength measurement unit RM1. The second channel Ch2 comprises a second activity detector AD2, and a second signal strength measurement unit RM2. The $N^{th}$ channel ChN comprises an $N^{th}$ activity detector ADN, and an $N^{th}$ signal strength measurement unit RMN. The receiver further comprises a comparison unit CU and a pattern detector PD. Each activity detector AD1, AD2, . . . , ADN, has an input to receive a carrier signal LF. Furthermore, each activity detector AD1, AD2, . . . , ADN, has an output to provide a respective activity signal, AS1, AS2, . . . , ASN. Each signal strength measurement unit RM1, RM2, . . . , RMN, has an input to receive the respective activity signal AS1, AS2, . . . , ASN. Each signal strength measurement unit RM1, RM2, . . . , RMN further has an output to provide a respective received signal strength indication signal RS1, RS2, . . . , RSN. The comparison unit CU for each channel Ch1, Ch2, . . . , ChN, has an input to receive the respective received signal strength indication signal RS1, RS2, . . . , RSN. The comparison unit has an output to provide a selection signal SG. The pattern detector PD for each channel Ch1, Ch2, . . . , ChN, has an input which is coupled to the output of the respective signal strength measurement unit RM1, RM2, . . . , RMN. The pattern detector PD further has an output to provide a respective wake-up signal WU1, WU2, . . . , WUN. The receiver further comprises a control unit CTL which is coupled to each activity detector AD1, AD2, . . . , ADN, and to each signal strength measurement unit RM1, RM2, . . . , RMN.

The functioning of the wake-up receiver is explained below in conjunction with FIG. 2.

Figure 2:
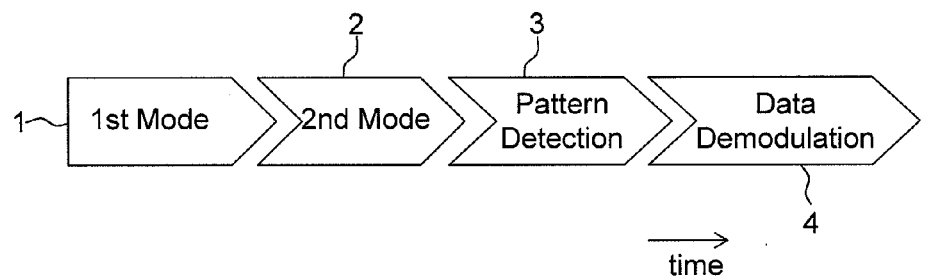
FIG. 2 shows an embodiment example of a wake-up method for a multi-channel receiver.

FIG. 2 shows an embodiment example of a wake-up method for a multi-channel receiver. The method comprises the following steps which are depicted in an exemplary chronological order from left to right: first mode of operation 1, second mode of operation 2, phase of pattern detection 3, phase of data demodulation 4. The method is explained in detail in conjunction with the multi-channel wake-up receiver shown in FIG. 1.

In the first mode of operation 1, every channel Ch1, Ch2, ..., ChN is checked for activity in a channel rotation procedure controlled by the control unit CTL. This means: The first activity detector AD1 of the first channel Ch1 is activated, the first activity detector AD1 checks the carrier signal LF for presence of a carrier, then the first activity detector AD1 is deactivated. Subsequently, the second activity detector AD2 of the second channel Ch2 is activated, the second activity detector AD2 checks its input for the presence of a carrier, then the second activity detector AD2 is deactivated. This procedure is continued with every available channel until the $N^{th}$ channel ChN. The $N^{th}$ activity detector ADN is activated, the $N^{th}$ activity detector ADN checks its input for the presence of a carrier, then the $N^{th}$ activity detector ADN is deactivated. The procedure continues from the start by activating again the first activity detector AD1 and so on. In this first mode of operation 1, also called sniff mode or scanning mode, one independent channel after the other is checked for detection of the presence of a carrier. As soon as a carrier is detected by one of the activity detectors AD1, AD2, ..., ADN, the second mode of operation 2 begins.

In the second mode of operation 2, all channels Ch1, Ch2, ..., ChN, are switched on and a measurement of the signal strength received on every channel is performed simultaneously by all signal strength measurements units RM1, RM2, ..., RMN, controlled by the control unit CTL. The comparing unit CU compares the received signal strength indication signals RS1, RS2, ..., RSN and provides the selection of the number of the channel with the highest received signal strength as selection signal SG.

In this way, it is possible to perform a multi-directional monitoring of the electromagnetic field surrounding the receiver with a current consumption of a single channel, as only one channel is active at a time during the first mode of operation 1. At the same time, the resulting sensitivity of the receiver is as good as if all channels were active at the same time.

Next, the receiver enters the phase of pattern detection 3. In this phase, the pattern detector PD correlates a received pattern of the carrier signal LF with a stored pattern. If pattern detection is successful, the pattern detector PD generates a wake-up signal WU.

Subsequently, data demodulation 4 starts. Data from a sender is received and passed on to a main system which can be connected to the receiver.

Figure 3:
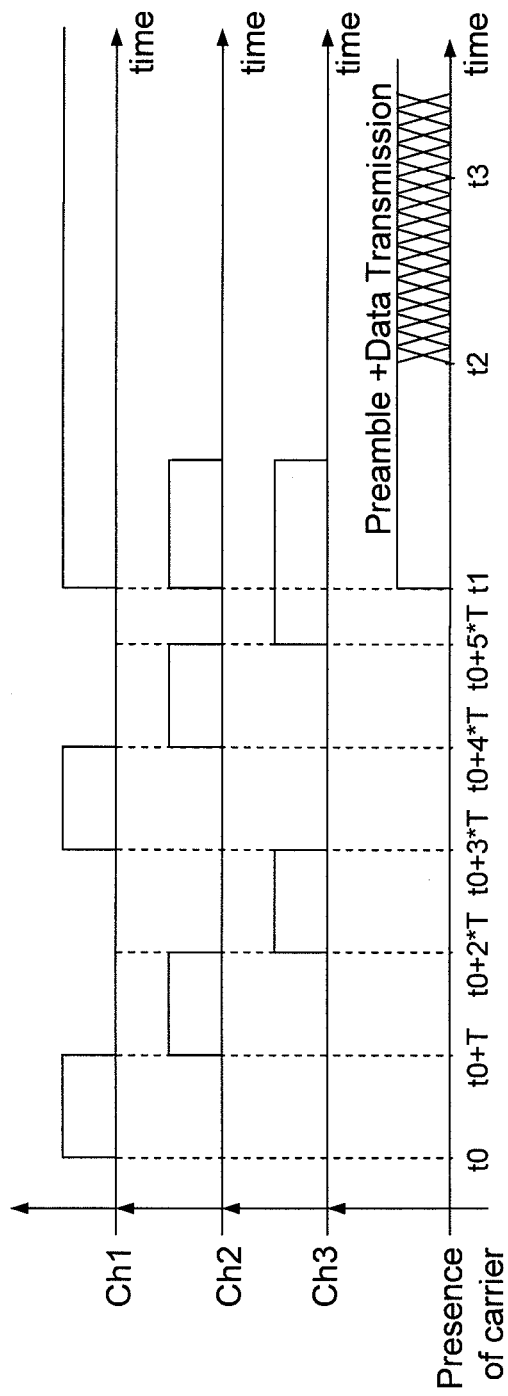
FIG. 3 shows detailed timing diagrams of a wake-up process for a multi-channel receiver.

FIG. 3 shows a detailed timing diagram of a wake-up process for a multi-channel receiver. In this example, the receiver comprises three channels, a first channel Ch1, a second channel Ch2, and a third channel Ch3. At a point in time t0, the first mode of operation 1 starts with the channel rotation. At the point in time t0, the first channel Ch1 is checked for activity. The duration of this check which corresponds to the run time of the first activity detector AD1, is a period T of time. At a point in time t0+T, the receiver switches to the second channel Ch2. The second channel Ch2 is checked for the presence of a carrier. At the point in time t0+2T, the receiver switches to the third channel Ch3 for detection of a carrier. At a point in time t0+3T, the receiver again switches to the first channel Ch1 for activity detection. The channel rotation continues with a switch to the second channel Ch2 and the subsequent switch to the third channel Ch3.

At a point in time t1, the presence of a carrier is detected on the third channel Ch3. The receiver enters the second mode of operation 2. All the channels Ch1, Ch2, and Ch3 are activated. A measurement of a received signal strength, for example a received signal strength indicator, RSSI, is performed simultaneously on all channels Ch1, Ch2, and Ch3. Then a comparison between the RSSI values is conducted. In this example, the first channel Ch1 delivers the strongest signal, therefore, the first channel Ch1 is selected for a subsequent pattern detection starting at a point in time t2. At the point in time t2, a preamble followed by a digital pattern is received. After successful pattern detection, at a point in time t3, data demodulation starts.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

The invention claimed is:

1. A wake-up method for a multi-channel wake-up receiver, the method comprising:
   in a first mode of operation, checking for activity on every available channel by switching from one channel to the next thereby cyclically activating and subsequently deactivating one channel after the other in the receiver, wherein activating and subsequently deactivating a channel is realized by activating a respective activity detector of the channel, checking for a carrier signal in the channel, and deactivating the activity detector of the channel;
   when activity is detected at least on one of the available channels, entering a second mode of operation by switching on all channels by activating all activity detectors and all signal strength measurement units at the same time, measuring a respective received signal strength in every channel and performing a comparison of received signal strengths between all channels; and
   selecting a channel of the available channels with the highest received signal strength,
   wherein each channel of the available channels corresponds to a respective antenna mountable to the receiver.

2. The method according to claim 1, wherein a logarithmic envelope amplifier is used in each channel for received signal strength measurement.

3. The method according to claim 1, wherein during measuring the respective received signal strengths in every channel and performing the comparison of received signal strengths between all channels a preamble of the received signal is detected.

4. The method according to claim 1, wherein after selecting the channel with the highest received signal strength a detection of a wake-up pattern in the received signal is performed in the selected channel.

5. A multi-channel wake-up receiver comprising:
   a plurality of channels, each channel of the plurality of channels comprising,
      an activity detector with an input to be supplied with a carrier signal and an output to provide an activity signal, and
      a signal strength measurement unit coupled to the output of the activity detector with an output to provide a received signal strength indication signal; and
   a comparison unit coupled to the output of each signal strength measurement unit having an output to provide a selection of the channel with the highest received signal strength,
   wherein each channel of the plurality of channels corresponds to a respective antenna mountable to the multi-channel wake-up receiver, and
   wherein a duration of the carrier signal is at least the sum of runtimes of all activity detectors of the receiver.

6. The receiver according to claim 5, wherein the respective signal strength measurement unit comprises a logarithmic envelope amplifier.

7. The receiver according to claim 5, further comprising at least one pattern detector coupled to the output of each signal strength measurement unit with an output to provide a wake-up signal.

8. The receiver according to claim 5, wherein the carrier signal comprises a low-frequency, modulated signal.

9. The receiver according to claim 5, wherein the carrier signal comprises a preamble followed by a wake-up pattern.

10. A multi-channel wake-up receiver with several channels, each channel comprising:
    an activity detector with an input to be supplied with a carrier signal and an output to provide an activity signal, and
    a signal strength measurement unit coupled to the output of the activity detector with an output to provide a received signal strength indication signal, and
    the receiver further comprising:
    a comparison unit coupled to the output of each signal strength measurement unit having an output to provide a selection of the channel with the highest received signal strength, wherein each channel corresponds to a respective antenna mountable to the receiver, and
    a control unit, the control unit being configured to run the receiver in a first mode of operation and in a second mode of operation, wherein in the first mode of operation only the activity detectors are cyclically activated channel by channel, and in the second mode of operation all activity detectors and all signal strength measurement units are activated at the same time.

11. The receiver according to claim 10, wherein the respective signal strength measurement unit comprises a logarithmic envelope amplifier.

12. The receiver according to claim 10, further comprising at least one pattern detector coupled to the output of each signal strength measurement unit with an output to provide a wake-up signal.

13. The receiver according to claim 10, wherein a duration of the carrier signal is at least the sum of runtimes of all activity detectors of the receiver.

14. The receiver according to claim 10, wherein the carrier signal comprises a low-frequency, modulated signal.

15. The receiver according to claim 10, wherein the carrier signal comprises a preamble followed by a wake-up pattern.

\* \* \* \* \*